(12) United States Patent
Yamagishi et al.

(10) Patent No.: US 7,124,422 B2
(45) Date of Patent: Oct. 17, 2006

(54) DISK ACCOMMODATION CASE HAVING REMOVAL MEMBER

(75) Inventors: Masanao Yamagishi, Fukui (JP); Takao Terasaka, Fukui (JP); Sohichi Ishizuka, Fukui (JP)

(73) Assignee: Just Corporation Co., Ltd., Fukui-Ken (JP)

( * ) Notice: Subject to any disclaimer, the term of this patent is extended or adjusted under 35 U.S.C. 154(b) by 384 days.

(21) Appl. No.: 10/743,795

(22) Filed: Dec. 24, 2003

(65) Prior Publication Data

US 2004/0139461 A1    Jul. 15, 2004

(30) Foreign Application Priority Data

Dec. 27, 2002   (JP)   ............................. 2002-380693

(51) Int. Cl.
*G11B 23/03*   (2006.01)
*B65D 85/57*   (2006.01)

(52) U.S. Cl. ..................................... 720/728; 206/308.1
(58) Field of Classification Search ................ 720/728, 720/734; 206/307, 308.1
See application file for complete search history.

(56) References Cited

U.S. PATENT DOCUMENTS

| | | | |
|---|---|---|---|
| 5,788,068 A | 8/1998 | Fraser et al. | ................ 206/310 |
| 6,016,909 A * | 1/2000 | Chang | ........................ 206/310 |
| 6,056,117 A * | 5/2000 | Courchesne | ............. 206/308.1 |
| 6,454,091 B1* | 9/2002 | Mendoza et al. | ........ 206/308.1 |
| 2001/0047947 A1* | 12/2001 | Lau | ........................... 206/310 |
| 2002/0100701 A1* | 8/2002 | Chiu | ....................... 206/308.1 |
| 2002/0130056 A1 | 9/2002 | Pijanowski et al. | ......... 206/310 |
| 2002/0139701 A1* | 10/2002 | Luckow | .................. 206/308.1 |
| 2003/0052024 A1 | 3/2003 | Farrar et al. | ................ 206/310 |
| 2005/0205441 A1* | 9/2005 | Goto et al. | .............. 206/308.1 |

FOREIGN PATENT DOCUMENTS

EP   0 886 278   12/1998

* cited by examiner

*Primary Examiner*—Julie Anne Watko
(74) *Attorney, Agent, or Firm*—Wenderoth, Lind & Ponack, L.L.P.

(57) ABSTRACT

To make it possible to keep a disk-like recording medium accommodated in a case under a stable state without shaking and to easily take it out, a receiving table on which a center portion of a disk is put is so formed at a base center of a main body as to protrude from a base surface. An outer peripheral edge for supporting thereon a disk outer periphery protrudes from the receiving table as a center. A removal member for supporting the outer periphery of the disk and engaging with the outer periphery is disposed by cutting off a part of the outer peripheral edge. The removable member includes a lift portion for supporting thereon the disk outer periphery, formed inside a rocking lever and a button formed outside the lever. Hooks for engaging with the disk outer periphery are provided to the lever.

4 Claims, 10 Drawing Sheets

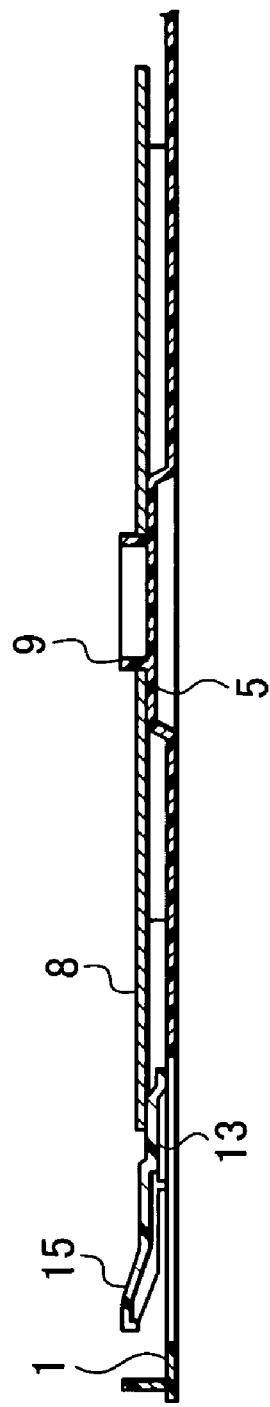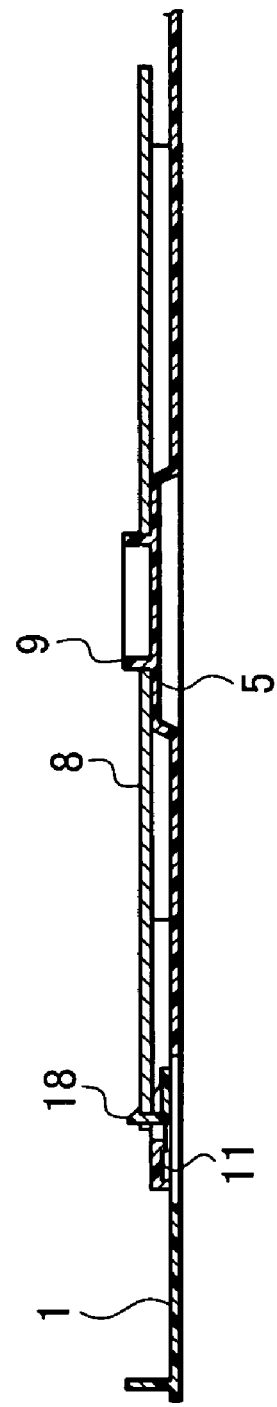

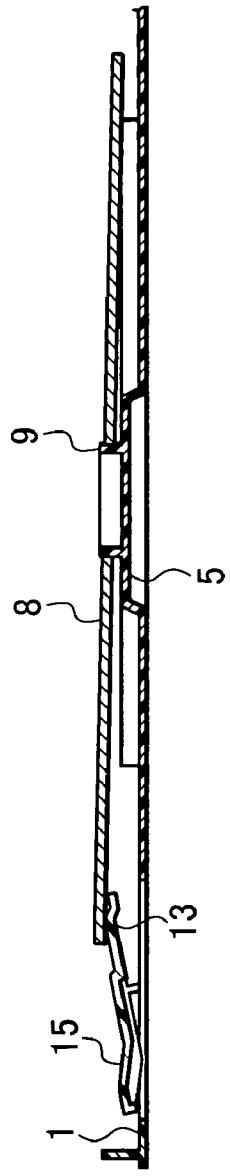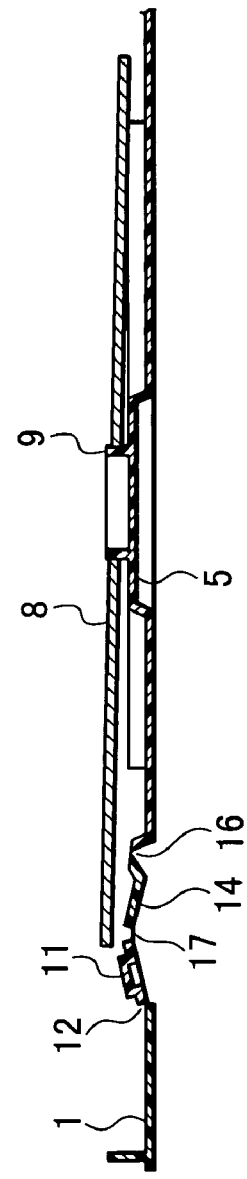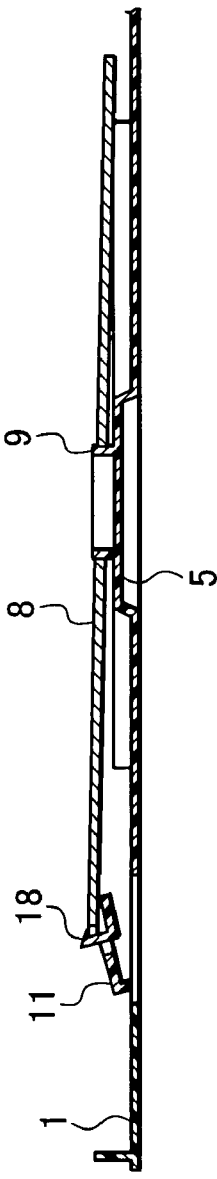

DISK ACCOMMODATION CASE HAVING REMOVAL MEMBER

BACKGROUND OF THE INVENTION

1. Field of the Invention

This invention relates to an accommodation case that accommodates a disk-like recording medium such as a CD, a DVD, game software, or the like.

2. Related Art

A disk-like recording medium such as a CD has a thin disk-like outer shape and a small round hole at its center that is so formed as to penetrate through the disk. The disk-like recording medium is accommodated in a thin accommodation case. The accommodation case includes a box-shaped main body having the widest surface on a base side and a cover having the widest surface on a cover side. The cover is connected to the main body through a connection portion and can cover the main body.

The disk-like recording medium is fitted to a holding portion formed at the center of the base of the main body in such a fashion that the base is fitted into a hole formed at the center of the disk-like recording medium. Various forms of the holding portion are known. However, the holding portion must satisfy the requirements that the disk-like recording medium fitted at its center hole to the holding portion does not shake but remains stable, does not naturally fall off from the hole and can be easily removed at the time of removal.

"Apparatus for Holding a Compact Disk" disclosed in US 20030052024A1 employs the following construction. The device includes a base, radial direction arms flexibly cantilevered from the base and extending inward and disk engagement means formed at an inner end portion of each arm, for engaging with a center hole of a disk in such a fashion as to be capable of releasing the center hole and for supporting the center portion of the disk in a spaced-apart relation from the base. Each of the arms includes first rotation means positioned inside a region in which it is connected to the base and second rotation means positioned inward relative to the first rotation means in the radial direction. When the disk engagement means is pushed down towards the base, the inner end of each of the arms and the center portion of the disk are pushed down towards the base. Each arm first rotates with the first rotation means as the center and then keeps its rotation with the second rotation means as the center until the holding force of the disk by the disk engagement means is released.

The disk is fitted while its center hole engages with the engagement means. To remove the disk, the engagement means engaging with the hole must be pushed from above to release it from the hole. When the engagement means is pushed, however, a load acts simultaneously on the disk and the disk undergoes deflective deformation. As a result, the disk is sometimes broken when it is taken out. In case the engagement means is loosely fitted to the center hole of the disk to make it easier to remove the disk, however, the disk falls off by itself under the accommodation state.

Such problems similarly occur not only in "Apparatus for Holding a Compact Disk" of US 20030052024A1 described above but also in "Apparatus for Holding a Compact Disk" disclosed in US 20020130056A1 and U.S. Pat. No. 5,788, 068A, respectively.

On the other hand, a disk holding device that fixes an outer peripheral edge of a disk is also known. For example, "Disk retainer" disclosed in EP 0886278 A1 includes a pair of arc locators for forming a substantially round open portion into which a disk is fitted, disk engagement means having a support member and a clip member and means such as a leaf spring for biasing the disk member and causing it to engage with the clip member.

When the disk is fitted to this disk holding device described above, an inserting direction becomes necessary to hook the disk on the support member. To release the disk, the clip member having a lever is pushed to disengage the disk. However, according to such a two-point structure, the problem arises that the disk is likely to become unstable when it is fixed and released.

The accommodation cases of the disk-like recording medium according to the prior art are not yet free from the problems described above. To solve these problems, the invention aims at providing an accommodation case of a disk-like recording medium that keeps a disk-like recording medium accommodated under a stable state without shaking and makes it possible to easily remove the recording medium.

SUMMARY OF THE INVENTION

The accommodation case of a disk-like recording medium according to the invention keeps a disk-like recording medium accommodated under a stable state without shaking and makes it possible to easily remove the disk-like recording medium. A receiving table is so disposed at the center of a main body as to protrude from a base surface, an outer peripheral edge extends from the base surface with the receiving table as the center, a center portion of a disk is put on and supported by the outer peripheral edge and an outer periphery of the disk is put on and supported by the peripheral edge.

A removal member is disposed by cutting off a part of the outer peripheral edge described above. The removal member has a rocking lever. A button is formed on an outer side of the lever and a lift portion, on an inner side. A hook is further provided to the lever. A part of the outer periphery of the disk accommodated in a main body is put on and supported by the lift portion and the outer periphery is engaged with and fixed by the hook. When a rib or a hook protrude from the receiving table, the rib fits into the center hole of the disk and the hook engages with an inner periphery of the center hole and fixes it. The removal member can fix the disk to the main body in cooperation with the hook.

A hook is disposed in some cases at a part of the outer peripheral edge and engages with the outer periphery of the disk. In other words, the accommodation case according to the invention has the construction in which the removal member supports and fixes the outer periphery of the disk as the disk-like recording medium and the disk center hole or other outer peripheral portion is fixed to the base of the main body. In the invention, the receiving table for supporting the disk center portion need not always be disposed at the center of the base of the main body. Embodiments of the invention will be hereinafter explained in detail with reference to the accompanying drawings.

BRIEF DESCRIPTION OF THE DRAWING

FIG. 7 is a sectional view of FIG. 3 showing a state in which the outer periphery of the disk is put on a lift portion of a removal member;

FIG. 8 is a sectional view showing a state in which the outer periphery of the disk engages with the hook of the removal member;

FIG. 9 is a sectional view showing a state in which the outer periphery of the disk is lifted up by the lift portion of the removal member;

FIG. 10 is a sectional view showing a bending state of arms and levers when the lift portion is lifted up;

FIG. 11 is a sectional view showing a state in which the outer periphery of the disk is lifted up and the hook is disengaged;

DETAILED DESCRIPTION OF PREFERRED EMBODIMENTS

Figure 1:
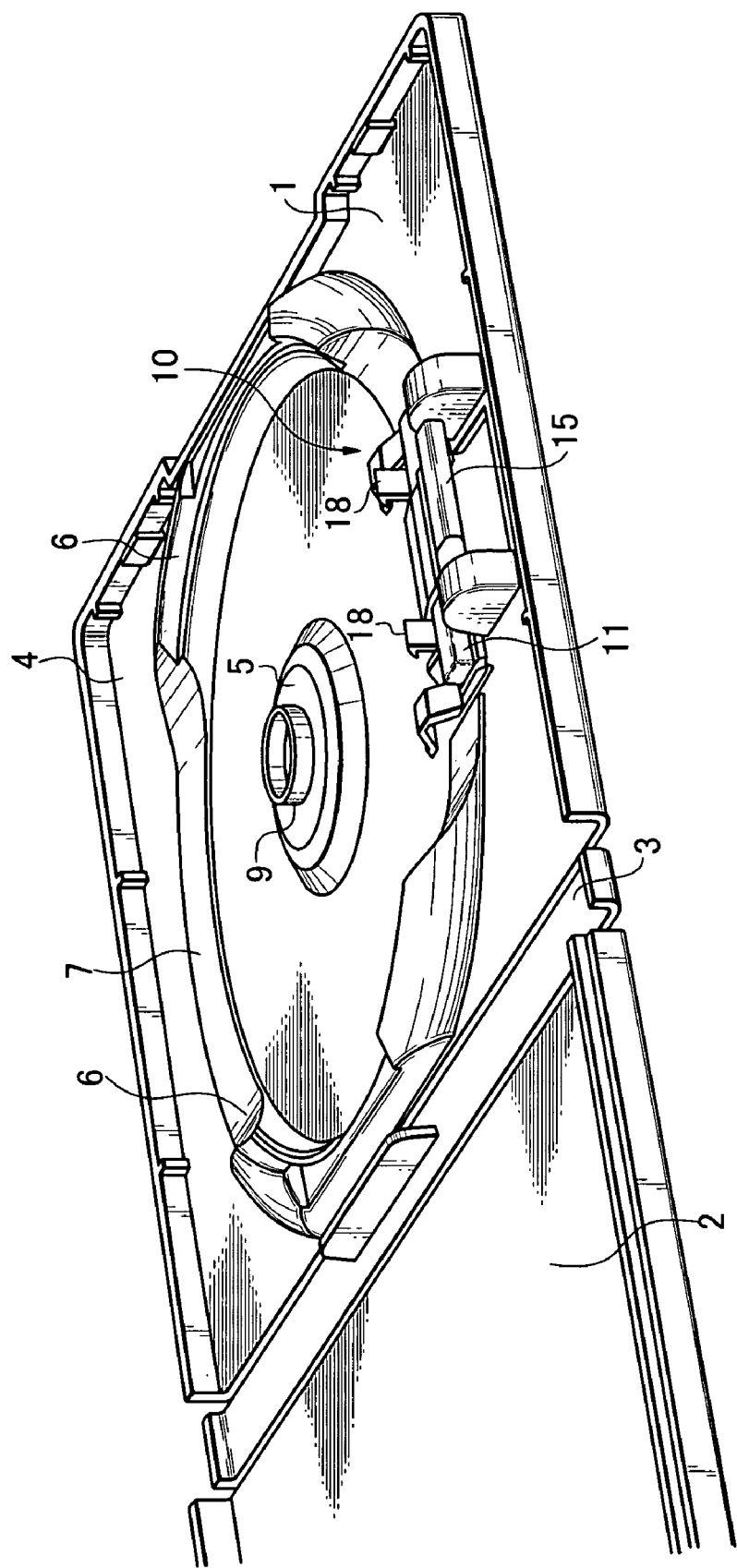
FIG. 1 is a perspective view showing a disk accommodation case according to an embodiment of the invention.

FIG. 1 shows an accommodation case of a disk-like recording medium according to an embodiment of the invention. Reference numeral 1 denotes a main body and reference numeral 2 denotes a cover. The main body 1 has a box-like shape having the widest surface on a base side and the cover 2 has the widest surface on a cover side. The cover 2 is connected to the main body 1 through a connection portion 3 and can cover the main body 1. A receiving table 5 protrudes from a base surface 4 at the center of the main body 1. An outer peripheral edge 6 extends with the receiving table 5 as its center and notches 7, 7 and so on are formed at four positions of the outer peripheral edge 6.

A removal member 10 is provided to the notch 7 of the outer peripheral edge 6 extending from the main body 1. When a rib 9 drected from the receiving table 5 fits into a center hole of the disk and the outer periphery of the disk is put on the outer peripheral edge 6, the removal member 10 prevents shaking of the disk, including of course its fall-off, and can lift up the outer periphery of the disk when the disk is removed.

Figure 2:
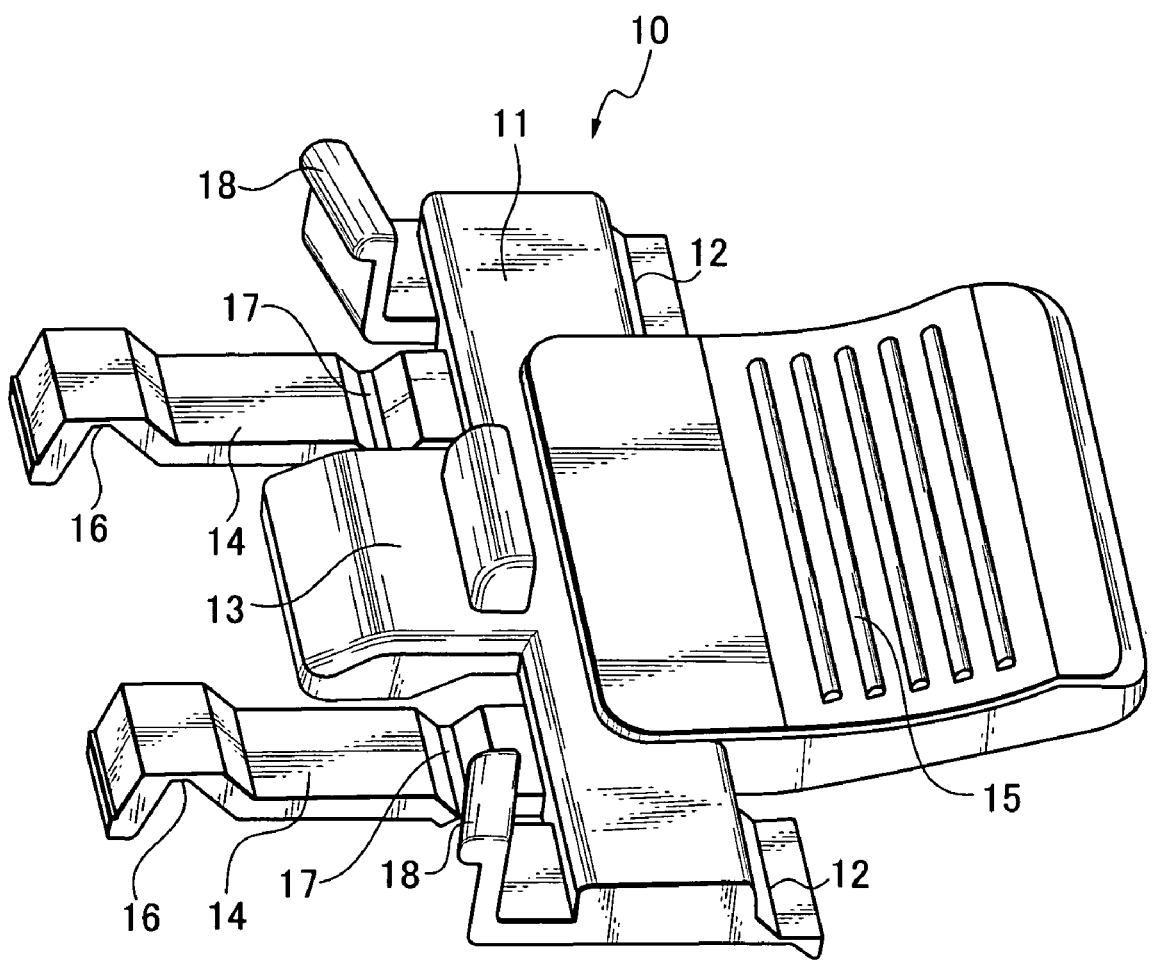
FIG. 2 is a perspective view showing a removal member provided to a main body thereof.

FIG. 2 is an enlarged view showing the removal member 10. A lever 11 is so adapted as to be capable of rocking. When the lever 11 rocks through outer hinges 12 connected to the base surface 4, the lever 11 can move up and down. A lift portion 13 protrudes inward at the center of the lever 11 and arms 14 and 14 are connected to both sides of the lever 11. The outer hinges 12 and 12 are connected to the base surface of the main body 1 and at the same time, the distal ends of the arms 14 and 14 are connected to the base surface of the main body 1.

When a button 15 protruding outward from the lever 11 is pushed, the lever 11 rocks with the outer hinge 12 formed of a thin portion as its axis and the lift portion 13 floats up. In this instance, the arms 14 and 14 are lifted up, too, but in a bent form because of operations of an inner hinge 16 and an intermediate hinge 17 provided to the arm 14. When lifted up, the arms 14 and 14 swell, keep balance and stop at a predetermined height.

Figure 3:
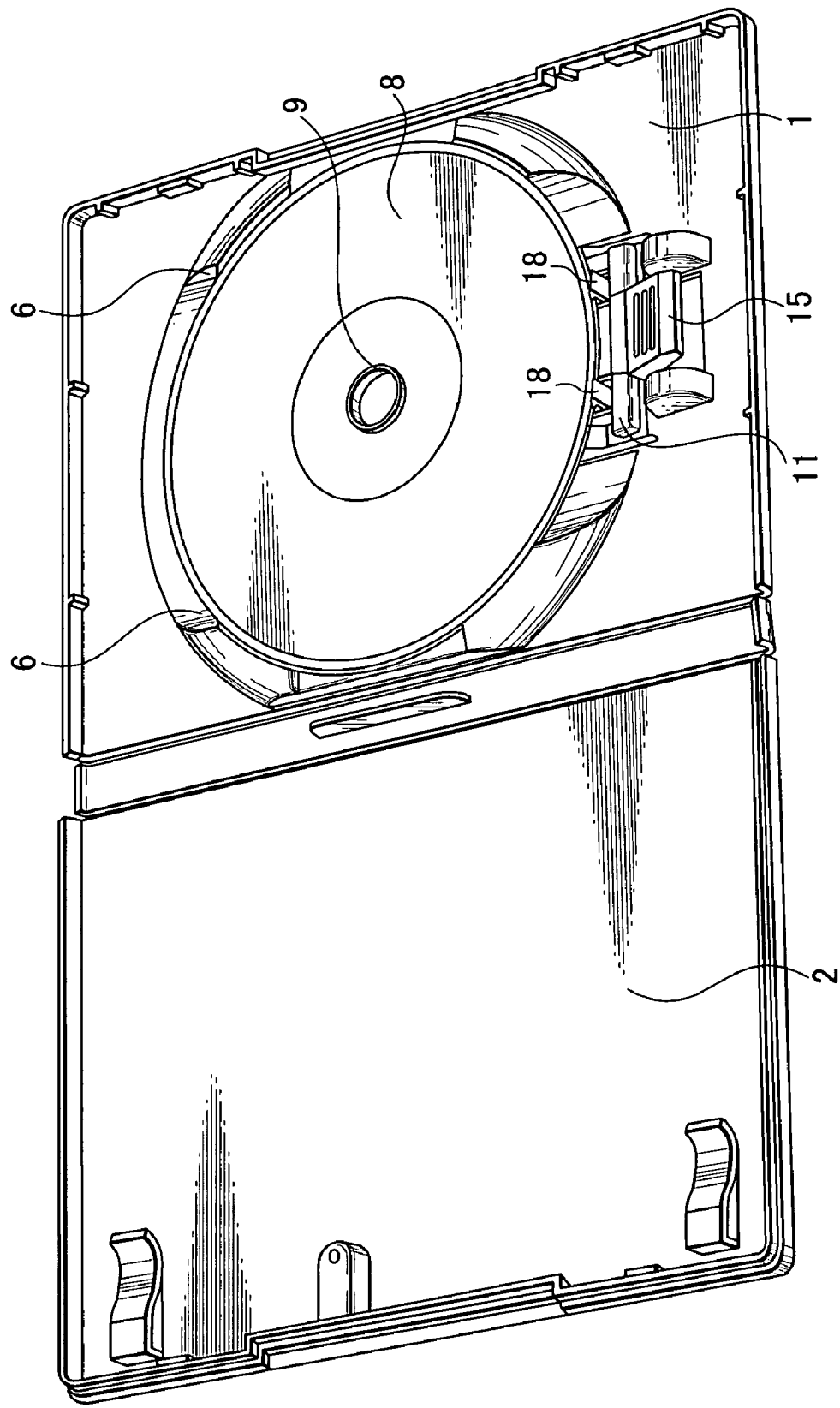
FIG. 3 is a perspective view showing a state that a disk is fitted to the main body.

Hooks 18 and 18 extend from both sides of the lever 11 and incline mutually inward so that they can engage with the outer periphery of the disk. FIG. 3 shows the state in which the disk 8 is fitted to the main body 1 of the accommodation case according to the invention. A rib 9 protruding from the center of the receiving table 5 fits into the center hole of the disk 8 and the outer periphery of the disk 8 is put on and supported by the outer peripheral edge 6. A part of the outer periphery of the disk 8 is put on the lift portion 13 of the removal member 10 and engages with both hooks 18 and 18.

Not only because the rib 9 at the center fits into the center hole but also because both hooks 18 and 18 of the removal member 10 engage with the outer periphery of the disk 8, the disk 8 does not shake and does not naturally come off from the rib 9, either. To remove the disk 8, the button 15 is pushed to let the lever 11 swing and the lift portion 13 protruding from the lever 11 is caused to float up. In consequence, the outer periphery of the disk is lifted up and at the same time, the hooks 18 and 18 come off from the outer periphery of the disk 8.

Figure 4:
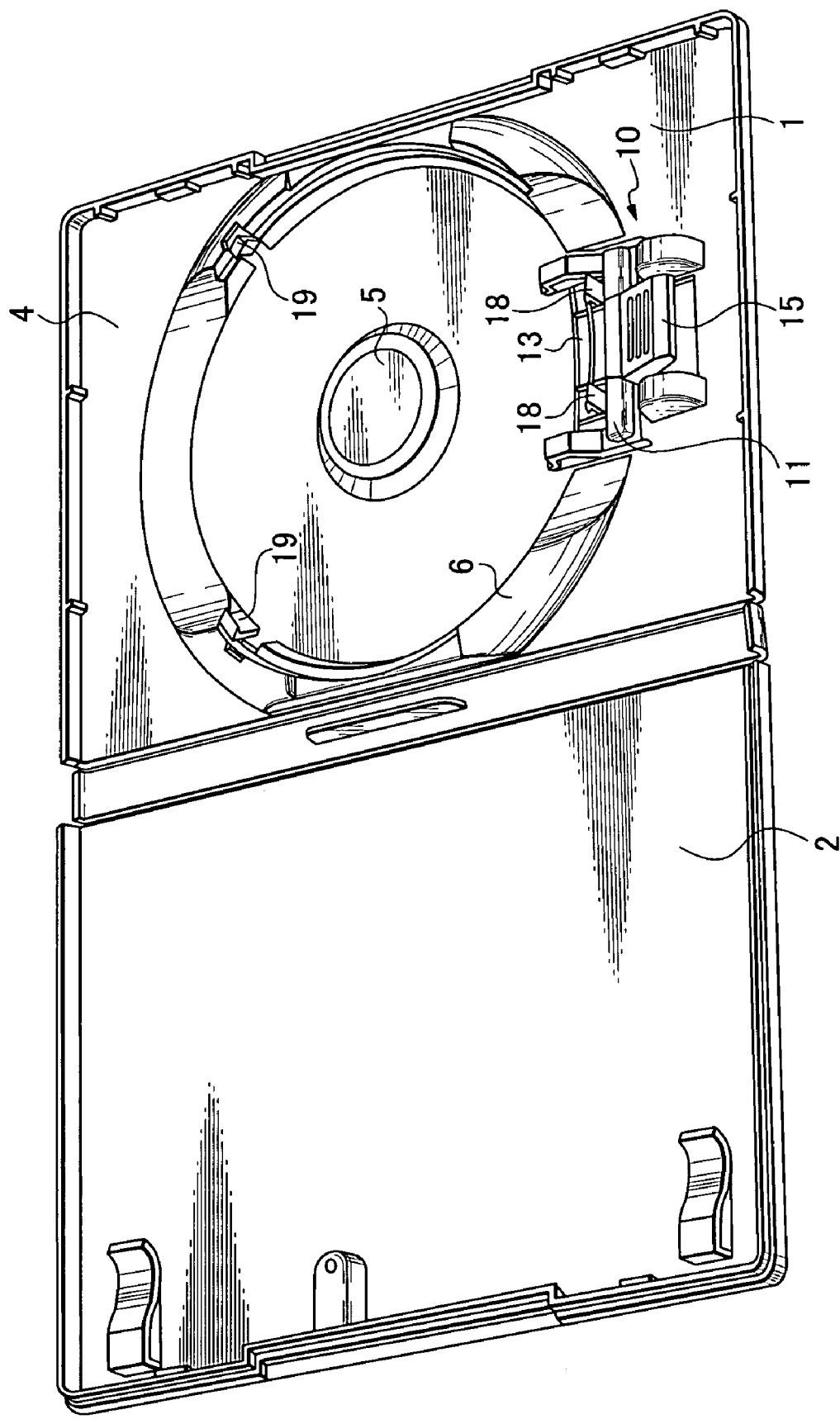
FIG. 4 is a perspective view showing a disk accommodation case according to another embodiment of the invention.

FIG. 4 shows a disk accommodation case according to another embodiment of the invention. The removal member 10 is provided to the notch 7 of the outer peripheral edge 6 but the rib fitting into the center hole of the disk does not protrude from the receiving table 5 at the center of the main body as shown in the drawing. Instead, the hooks 19 and 19 extend from the base surface 4 by cutting off parts of the outer peripheral edge 6. The removal member 10 has the same structure as the structure shown in FIG. 2. The center portion of the disk is put on the receiving table 5 and the outer periphery of the disk is supported by the outer peripheral edge 6. The hooks 19 and 19 and the hooks 18 and 18 of the removal member 10 engage with the outer periphery of the disk. Therefore, the disk does not come off from the main body 1 though the rib does not exist.

Figure 5:
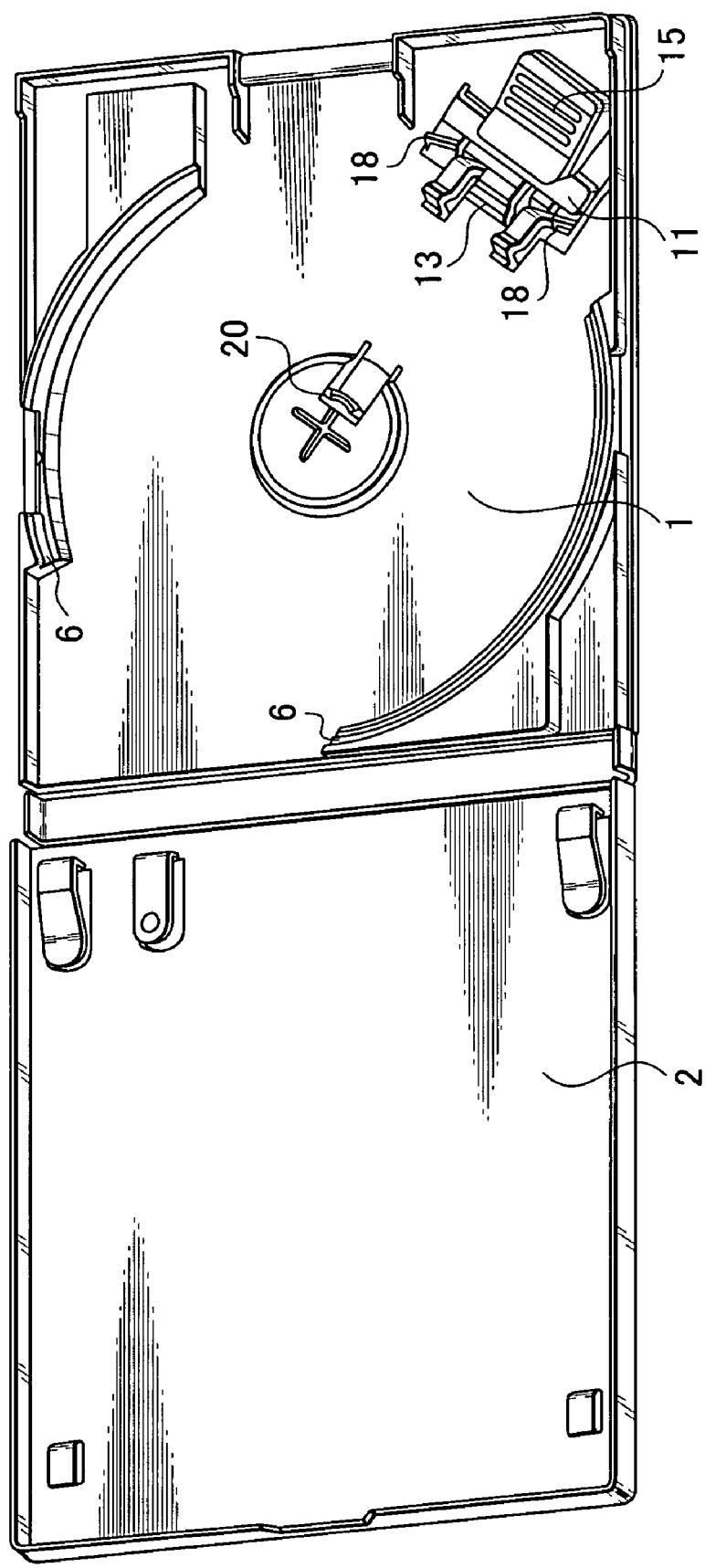
FIG. 5 is a perspective view showing a disk accommodation case according to still another embodiment of the invention.
Figure 6:
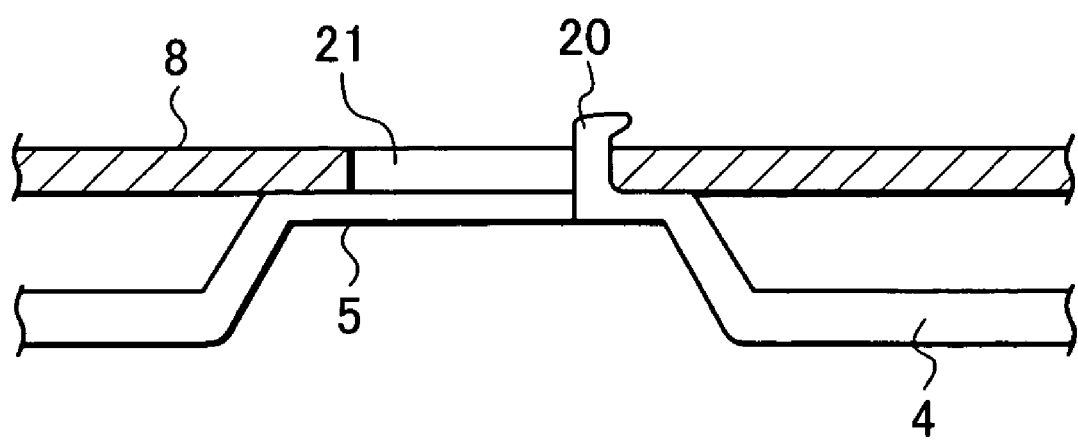
FIG. 6 is a sectional view showing a state where a hook of a receiving table engages with an inner periphery of a disk center hole.

FIG. 5 shows a disk accommodation case according to another embodiment of the invention. The accommodation case has the removal member 10 at the corner of the main body 1 as in the embodiment described above and a hook 20 erects from the receiving table 5. Here, the receiving table 5 does not have the cylindrical rib that fits into the center hole of the disk. The hook 20 and both hooks 18 and 18 of the removal member 10 can fix the disk 8 to the main body 1. The hook 20 erecting from the receiving table 5 fits into the center hole 21 of the disk put on the receiving table 5 and can engage with the inner periphery as shown in FIG. 6. The outer periphery of the disk is put on and supported by the outer peripheral edge 6 and is fixed by both hooks 18 and 18 of the removal member 10.

FIG. 7 shows the section under the state in which the disk 8 is fixed to the main body 1 of the accommodation case shown in FIG. 3. The center portion of the disk is put on the receiving table 5 and the rib 9 erected from the receiving table 5 fits into the center hole of the disk. A part of the outer periphery is put on the lift portion 13 protruding from the lever 11 of the removal member 10. FIG. 8 shows the state in which the disk 8 is fixed and the outer periphery of the disk engages with the hook 18 of the removable member 10. In other words, the rib 9 fits into the center hole of the disk 8 and the hooks 18 and 18 engage with two positions of the outer periphery of the disk lest the disk comes off from the main body 1.

FIG. 9 shows the state in which the button 15 is pushed in order to remove the disk 8 and the lever 11 is caused to rock so that the outer periphery of the disk is lifted up by the lift portion 13 protruding from the lever 11. Here, a small clearance exists between the center hole and the rib 9 fitted into the center hole. When the lift portion 13 floats up, the disk 8 comes off from the rib 9 and is lifted up as shown in the drawing. Here, the arm 14 is shaped in such a fashion that when the button 15 is pushed at this time to rock the lever 11, the lift portion 13 can stop at the floating position.

In other words, as shown in FIG. 10, the removal member 10 is provided with an outer hinge 12, an intermediate hinge 17 and an inner hinge 16. When the button 15 is pushed, the lever 11 and the arm 14 are bent and the lift portion 13 is floated up and stabilized. The lift portion 13 moves down and is stabilized under the state shown in FIG. 8, too. Because a compressive stress acts under the intermediate state, the lift portion 13 can stop at the floating position.

FIG. 11 shows the state where the lift portion 13 of the removal member 10 is floated up and the hook 18 comes off from the outer periphery of the disk. The hook 18 rocks with the lever 11. When the hook 18 comes off from the outer periphery of the disk, the disk 8 lifted up can be easily removed.

Incidentally, the disk accommodation case of this embodiment includes the main body and the cover and the cover is connected to the main body through the connection portion. However, the form of the accommodation case according to the invention is not limited.

Figure 12:
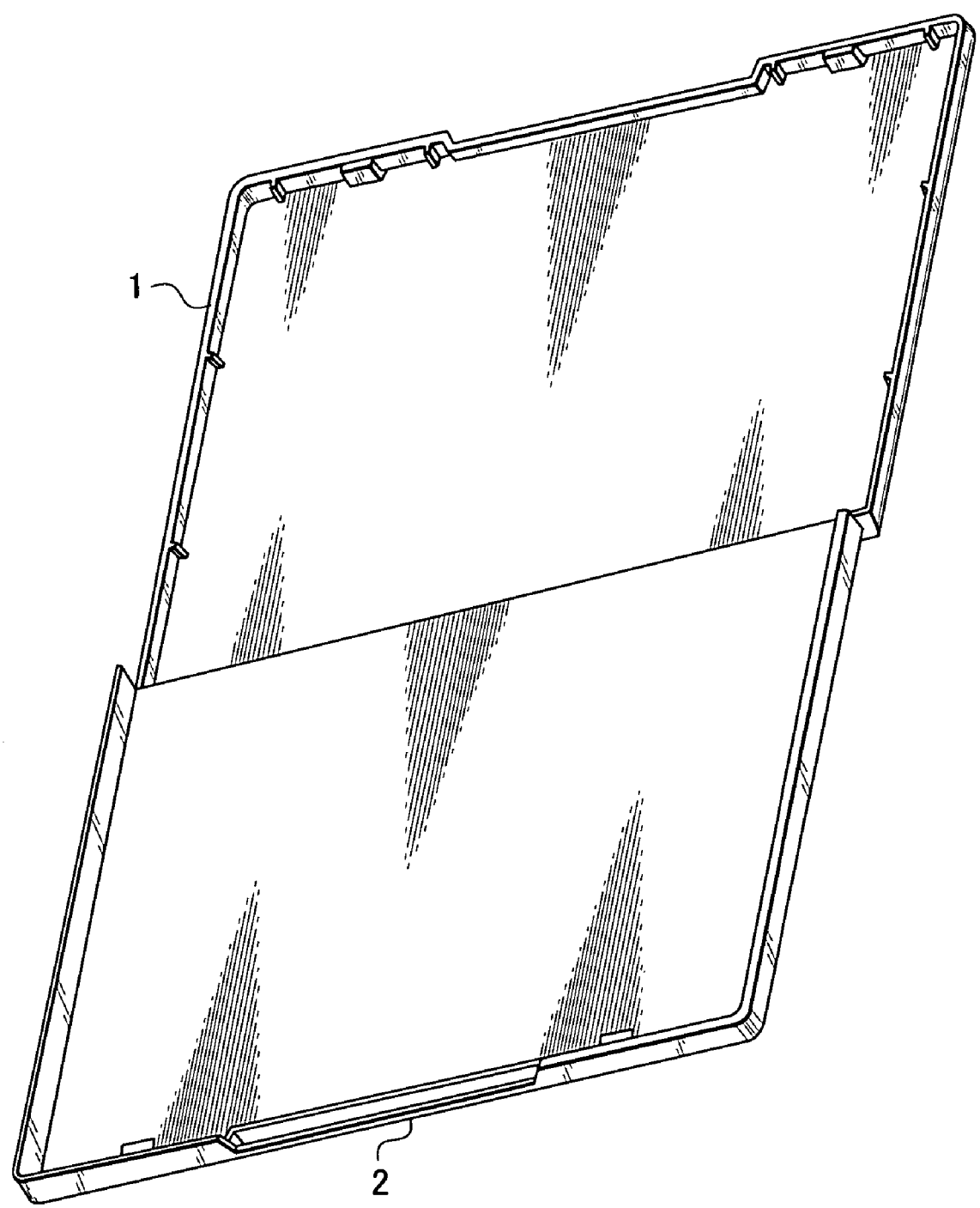
FIG. 12 is a perspective view showing a disk accommodation case according to still another embodiment of the invention.
Figure 13A:
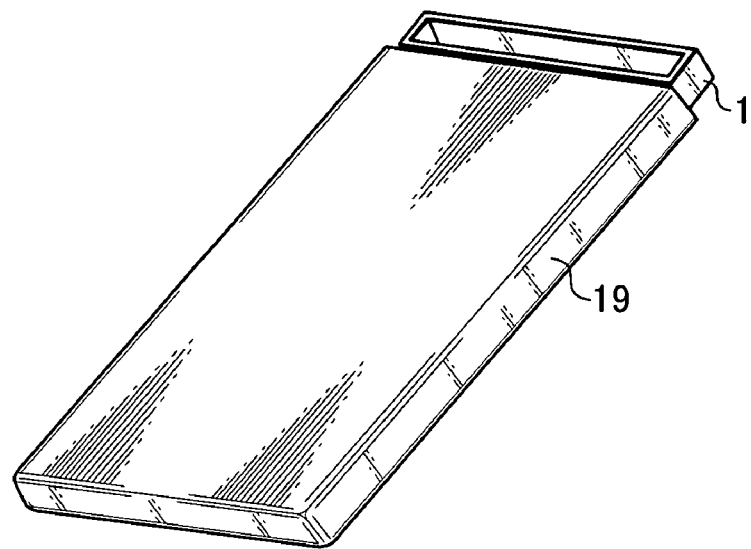
FIGS. 13(*a*) and (*b*) are perspective views showing a disk accommodation case according to still another embodiment of the invention.
Figure 13B:
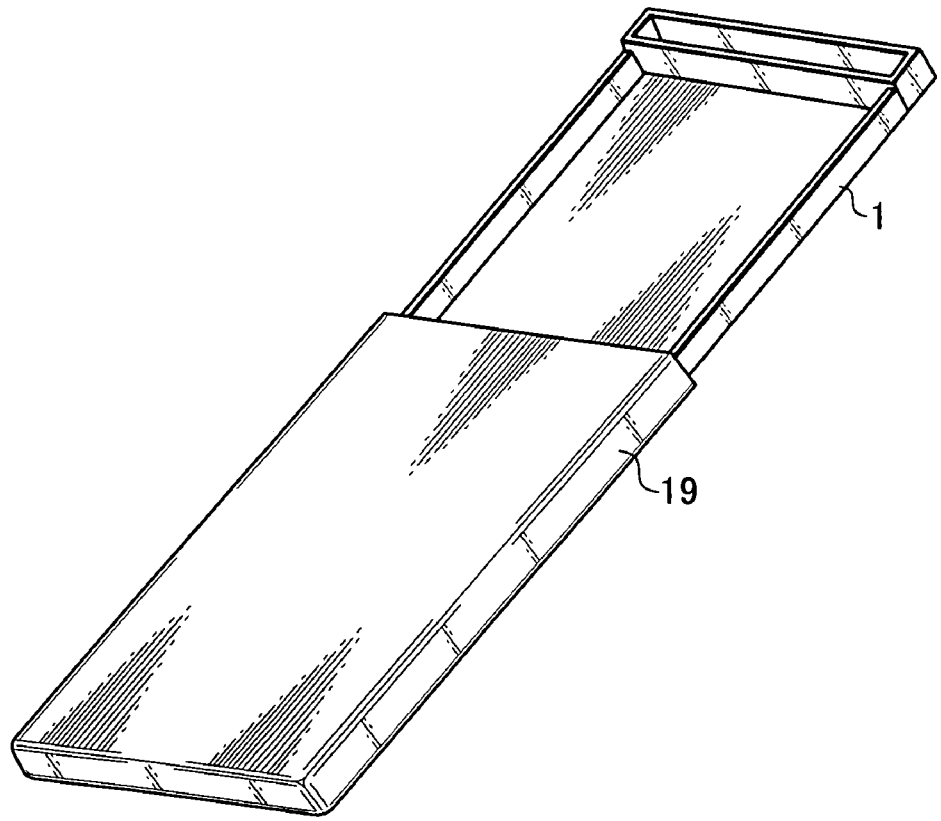

FIG. 12 shows still another embodiment of the accommodation case. This accommodation case does not have the connection portion but enables the cover to be opened and closed. For example, the main body and the cover can be connected by forming a hinge having a small thickness or through a shaft pin. In FIGS. 13(*a*) and (*b*), the main body 1 can be accommodated in a cover case 22. Needless to say, the receiving table and the outer peripheral edge are formed in the same way in such a fashion as to protrude from the base surface and the removal member 10 is provided.

As described above, the accommodation case according to the invention employs the construction in which the removal member is fitted to the notch of the outer peripheral edge for supporting the outer periphery of the disk. Therefore, the accommodation case of the invention can provide the following advantages.

In the accommodation case according to the invention, the removal member is provided to the main body and the removal member has the hook and the lift portion on the rocking lever. Therefore, the hook engages with the outer periphery of the disk fitted to the main body and the rib erected from the receiving table fits into the center hole of the disk. Therefore, the disk can be fixed without shaking. When the outer periphery of the disk engages with the hook provided to the outer peripheral edge, too, the disk engages also with the hook of the removal member and is fixed.

The lift portion protrudes inward from the lever of the removal member and supports thereon the outer periphery of the disk. When the button is pushed to rock the lever, the lift portion is floated up and the disk can be removed. Therefore, it is not necessary to hook a finger to the disk firmly fitted to the rib as has been necessary in the prior art and the disk can be easily fitted and removed.

What is claimed is:

1. An accommodation case of a disk-like recording medium for accommodating a disk-like recording medium, comprising:
    a main body having a base surface;
    a cover connected to the main body through a connection portion;
    a receiving table for supporting thereon a disk center portion, formed at a center of said main body in such a fashion as to protrude from said base surface;
    an outer peripheral edge for supporting thereon a disk outer periphery, formed in such a fashion as to protrude with said receiving table as a center;
    a removal member for supporting an outer periphery of the disk-like recording medium and engaging with the disk outer periphery, formed by cutting off said outer peripheral edge;
    said removal member including a lift portion for supporting thereon the disk outer periphery, formed inside a rocking lever, and a button formed outside said lever; and
    a hook for engaging with the disk outer periphery, provided to said lever;
    wherein arms each having a plurality of hinges extend from said lever and are connected to said base surface of said main body.

2. An accommodation case of a disk-like recording medium according to claim 1, wherein a rib for fitting to a center hole of the disk-like recording medium is so formed as to erect from said receiving table.

3. An accommodation case of a disk-like recording medium according to claim 1, wherein a hook for engaging with an inner periphery of the disk center hole is so formed on said receiving table as to erect from said receiving table.

4. An accommodation case of a disk-like recording medium according to claim 1, wherein hooks for engaging the disk outer periphery are formed by cutting off said outer peripheral edge.

* * * * *